United States Patent
Mathew (10) Patent No.: US 10,951,645 B2
(45) Date of Patent: *Mar. 16, 2021

(54) SYSTEM AND METHOD FOR PREVENTION OF THREAT

(71) Applicant: Marlabs Innovations Private Limited, Bengaluru (IN)

(72) Inventor: Bimodh Jo Mathew, Piscataway, NJ (US)

(73) Assignee: Marlabs Innovations Private Limited, Bangalore (IN)

(*) Notice: Subject to any disclaimer, the term of this patent is extended or adjusted under 35 U.S.C. 154(b) by 151 days.

This patent is subject to a terminal disclaimer.

(21) Appl. No.: 16/114,365

(22) Filed: Aug. 28, 2018

(65) Prior Publication Data

US 2020/0076845 A1    Mar. 5, 2020

(51) Int. Cl.
*H04L 29/06* (2006.01)
*H04L 12/24* (2006.01)
*G06F 16/951* (2019.01)

(52) U.S. Cl.
CPC ........ *H04L 63/1433* (2013.01); *G06F 16/951* (2019.01); *H04L 41/142* (2013.01); *H04L 41/145* (2013.01); *H04L 63/0263* (2013.01); *H04L 63/1425* (2013.01); *H04L 63/1441* (2013.01); *H04L 63/205* (2013.01); *H04L 41/22* (2013.01)

(58) Field of Classification Search
CPC . H04L 63/1433; H04L 41/142; H04L 41/145; H04L 63/0263; H04L 63/1425; H04L 63/1441; H04L 63/205; H04L 41/22; G06F 16/951
See application file for complete search history.

(56) References Cited

U.S. PATENT DOCUMENTS

| | | |
|---|---|---|
| 7,096,498 B2 | 8/2006 | Judge |
| 7,463,590 B2 | 12/2008 | Mualem et al. |
| 8,407,798 B1* | 3/2013 | Lotem ............... G06F 21/577 726/25 |
| 2009/0067440 A1* | 3/2009 | Chadda ............. H04L 63/0227 370/401 |
| 2009/0070322 A1* | 3/2009 | Salvetti ............. G06F 16/3334 |
| 2015/0128274 A1 | 5/2015 | Giokas |

(Continued)

FOREIGN PATENT DOCUMENTS

CN    106850293 A    1/2017

*Primary Examiner* — Ghodrat Jamshidi
(74) *Attorney, Agent, or Firm* — Jason C. Cameron (57) ABSTRACT

System and method for prevention of threat are disclosed. The system includes a processing subsystem. The processing subsystem includes a data extraction module configured to extract data from one or more internal sources such as a router, a firewall or a security solution and one or more external sources such as a deep, a dark and a surface web. The processing subsystem also includes an analysis module configured to analyse the data by using at least one threat analysis method for detection of the threat, a rule generation module configured to generate one or more rules to enable prevention of the threat detected, an implementation module configured to implement the one or more generated rules on at least one node associated with the one or more internal sources for prevention of the threat.

9 Claims, 3 Drawing Sheets

(56) References Cited

U.S. PATENT DOCUMENTS

| | | | |
|---|---|---|---|
| 2015/0350161 A1* | 12/2015 | Hsu | H04L 63/1425 726/13 |
| 2016/0080420 A1* | 3/2016 | Ray | G06F 16/285 726/1 |
| 2016/0148133 A1* | 5/2016 | Haggar | G06Q 10/063112 705/7.14 |
| 2017/0244736 A1* | 8/2017 | Benishti | H04L 63/1441 |
| 2017/0331839 A1* | 11/2017 | Park | H04L 63/1433 |
| 2018/0247312 A1* | 8/2018 | Loganathan | H04L 63/0876 |
| 2018/0288073 A1* | 10/2018 | Hopper | G06Q 20/4016 |
| 2018/0322749 A1* | 11/2018 | Kempel | G05D 1/0094 |
| 2019/0036906 A1* | 1/2019 | Biyani | H04L 63/20 |
| 2019/0166155 A1* | 5/2019 | Steele | H04L 63/1433 |
| 2019/0190934 A1* | 6/2019 | Peppe | H04L 63/08 |
| 2019/0340390 A1* | 11/2019 | Richards | G06F 21/6227 |

\* cited by examiner

SYSTEM AND METHOD FOR PREVENTION OF THREAT

FIELD OF INVENTION

Embodiments of the present disclosure relate to prevention of threat, and more particularly to a system and method for prevention of threat.

BACKGROUND

With linear growth in the technology, internet has become a source for immense quantities of data, which is used for various purposes by different organizations. One such purpose includes detecting a threat for the organization such as malicious activity or hacking. In general, the data in the internet is classified between surface web and deep web, which includes dark web. It is well known today, that most of the illegal activities or planning for a malicious activity take place in the deep web. Therefore, acquisition and analysis of data from the deep web has become important for the organizations to identify potential threats.

Conventional systems utilized by the organizations for preventing the threat is by detecting threats by acquiring data from the surface web, which includes data that is accessible by the well-known search engines. Upon acquiring the data, the conventional systems analyse the data and predicts a threat associated with the acquired data. Further, based on the predicted threat, a user must physically prevent the threat. Also, the conventional systems are unable to acquire data from the deep web as acquisition of data from the deep web requires advanced web crawlers capable of accessing the deep web. Furthermore, additional security protocols are required to be maintained by the system for maintaining anonymity. Such limitations confine the system from taking a measure upon predicting the threat and also limits the efficiency of threat prediction.

In comparison to the conventional systems, newer systems are capable of acquiring data from the deep web as the newer systems employ advanced crawlers and security protocols to acquire the data from the deep web. Furthermore, the newer systems analyse the threat associated with the acquired data and a generates an alert notification regarding the predicted threat. However, a user is employed to receive the alert notification and to take required measures in order to prevent the predicted threat. Such dependency of the user limits the newer systems by generating rules or instructions to automatically take measures towards preventing the predicted threat.

Hence, there is a need for an improved system and method for prevention of threat to address the aforementioned issues.

BRIEF DESCRIPTION

In accordance with one embodiment of the disclosure, a system for data analysis and prediction of threat is provided. The system includes a processing subsystem. The processing subsystem includes a data extraction module configured to extract data from one or more internal sources and one or more external sources. The one or more internal sources includes at least one of a firewall, a router and a security solution. The one or more external sources includes at least one of a deep web, a dark web and a surface web. The processing subsystem also includes an analysis module operatively coupled to the data extraction module. The analysis module is configured to analyse the data by using at least one threat analysis method for detection of the threat. The processing subsystem also includes a rule generation module operatively coupled to the analysis module. The rule generation module is configured to generate one or more rules to enable prevention of the threat detected. The processing subsystem also includes an implementation module operatively coupled to the rule generation module. The implementation module is configured to implement the one or more generated rules on at least one node associated with the one or more internal sources for prevention of the threat. The system also includes a memory operatively coupled to the processing subsystem. The memory is configured to store the one or more generated rules associated to the threat.

In accordance with another embodiment of the present disclosure, a method for preventing a threat is provided. The method includes extracting data from one or more internal sources and one or more external sources, The extracting the data from the one or more internal sources includes extracting the data from the at least one of a firewall, a router and a security solution associated with the one or more internal sources. The extracting the data from the one or more external sources includes extracting the data from at least one of a deep web, a dark web and a surface web associated with the one or more external sources. The method also includes analysing extracted data by using at least one threat analysis method for detection of the threat. The method also includes generating one or more rules to enable prevention of the threat detected. The method also includes implementing the one or more generated rules on at least one node associated with the one or more internal sources for preventing the threat. The method also includes storing the one or more generated rules associated to the threat.

To further clarify the advantages and features of the present disclosure, a more particular description of the disclosure will follow by reference to specific embodiments thereof, which are illustrated in the appended figures. It is to be appreciated that these figures depict only typical embodiments of the disclosure and are therefore not to be considered limiting in scope. The disclosure will be described and explained with additional specificity and detail with the appended figures.

BRIEF DESCRIPTION OF THE DRAWINGS

The disclosure will be described and explained with additional specificity and detail with the accompanying figures in which.

Further, those skilled in the art will appreciate that elements in the figures are illustrated for simplicity and may not have necessarily been drawn to scale. Furthermore, in terms of the construction of the device, one or more components of the device may have been represented in the figures by conventional symbols, and the figures may show only those specific details that are pertinent to understanding the embodiments of the present disclosure so as not to obscure the figures with details that will be readily apparent to those skilled in the art having the benefit of the description herein.

DETAILED DESCRIPTION

For the purpose of promoting an understanding of the principles of the disclosure, reference will now be made to the embodiment illustrated in the figures and specific language will be used to describe them. It will nevertheless be understood that no limitation of the scope of the disclosure is thereby intended. Such alterations and further modifications in the illustrated system, and such further applications of the principles of the disclosure as would normally occur to those skilled in the art are to be construed as being within the scope of the present disclosure.

The terms "comprises", "comprising", or any other variations thereof, are intended to cover a non-exclusive inclusion, such that a process or method that comprises a list of steps does not include only those steps but may include other steps not expressly listed or inherent to such a process or method. Similarly, one or more devices or sub-systems or elements or structures or components preceded by "comprises . . . a" does not, without more constraints, preclude the existence of other devices, sub-systems, elements, structures, components, additional devices, additional sub-systems, additional elements, additional structures or additional components. Appearances of the phrase "in an embodiment", "in another embodiment" and similar language throughout this specification may, but not necessarily do, all refer to the same embodiment.

Unless otherwise defined, all technical and scientific terms used herein have the same meaning as commonly understood by those skilled in the art to which this disclosure belongs. The system, methods, and examples provided herein are only illustrative and not intended to be limiting.

In the following specification and the claims, reference will be made to a number of terms, which shall be defined to have the following meanings. The singular forms "a", "an", and "the" include plural references unless the context clearly dictates otherwise.

Embodiments of the present disclosure relate to a system for prevention of threat. The system includes a processing subsystem. The processing subsystem includes a data extraction module configured to extract data from one or more internal sources and one or more external sources. The one or more internal sources includes at least one of a firewall, a router and a security solution. The one or more external sources includes at least one of a deep web, a dark web and a surface web. The processing subsystem also includes an analysis module operatively coupled to the data extraction module. The analysis module is configured to analyse the data by using at least one threat analysis method for detection of the threat. The processing subsystem also includes a rule generation module operatively coupled to the analysis module. The rule generation module is configured to generate one or more rules to enable prevention of the threat detected. The processing subsystem also includes an implementation module operatively coupled to the rule generation module. The implementation module is configured to implement the one or more generated rules on at least one node associated with the one or more internal sources for prevention of the threat. The system also includes a memory operatively coupled to the processing subsystem. The memory is configured to store the one or more generated rules associated with the threat.

Figure 1:
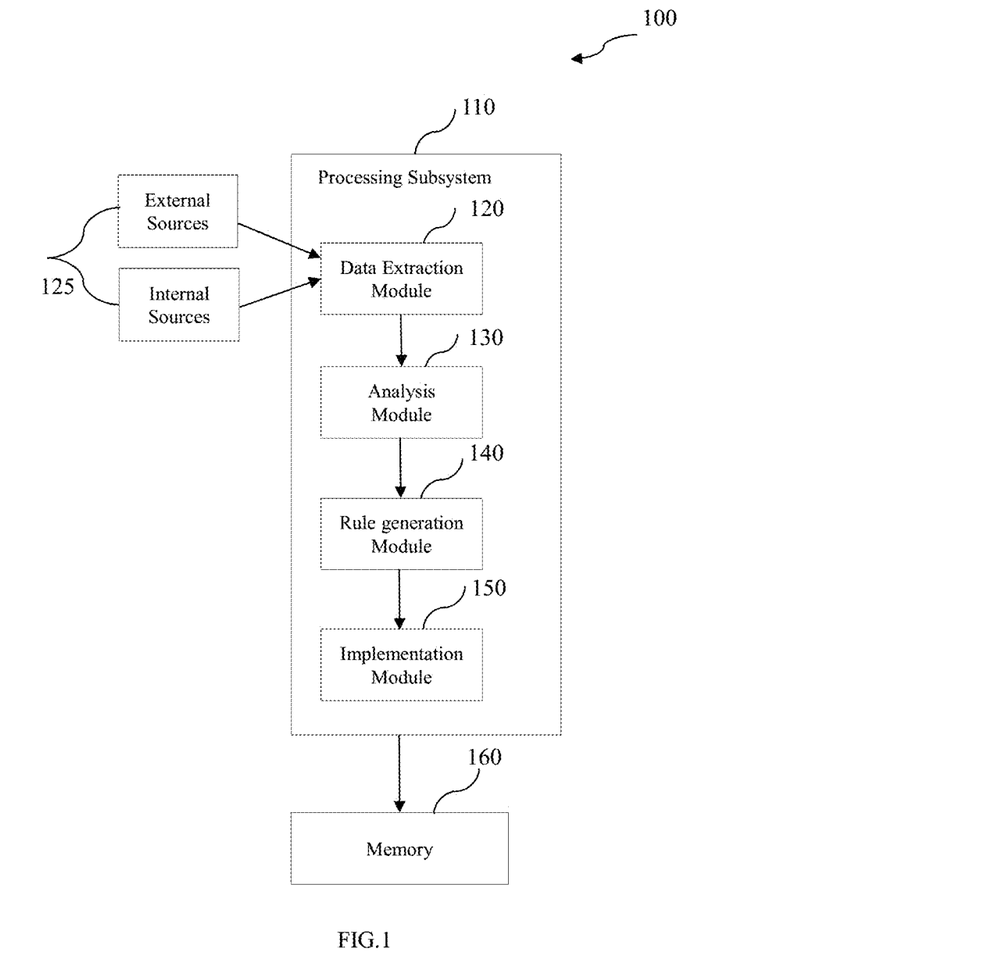
FIG. 1 is a block diagram representation of a system for prevention of threat in accordance with an embodiment of the present disclosure.

FIG. 1 is a block diagram of a system (100) for prevention of threat in accordance with an embodiment of the present disclosure. World wide web includes surface web, dark web and deep web which is referred to as one or more external sources. Further, content of the one or more external sources is not indexed by a standard search engine. Such one or more external sources is used by people to perform malicious activities such as hacking. Therefore, the present system (100) is employed to acquire data from the one or more external sources (125) and one or more internal sources (125) and generating one or more rules upon predicting the malicious activities by analysing the acquired data.

The system (100) includes a processing subsystem (110). The processing subsystem (110) includes a data extraction module (120) configured to extract data from one or more internal sources (125) and one or more external sources (125). The one or more internal sources (125) includes at least one of a firewall, a router and a security solution.

As used herein, the term 'firewall' is defined as a network security system used to protect the system which monitors and controls movement of network traffic. Also, the term 'router' is defined as is defined as a networking device which forwards data. packets between a plurality of computer networks. Further, the term 'security solution' is defined as a plurality of techniques which is configured to protect computer, network, data from unauthorised access or attacks. In one embodiment, the data from the one or more internal sources (125) may include the data associated with at least one of an audit report, a vulnerability assessment report and the like based on which the reconnaissance module (120) may access and acquire the data from the one or more internal sources (125) and the one or more external sources (125)

Similarly, the one or more external sources (125) includes at least one of a deep web, a dark web and a surface web. As used herein, the term 'deep web' is defined as part of the world wide web contents which are not indexed by standard web engines for any reason. Also, the term 'dark web' is defined as the world wide web content which exists on darknets, or on a computer network built on a top of another network which uses internet but require specific programs, configurations or authorization to access. Further, the term 'surface web' is defined as the portion of the world wide web content which is easily available to the general public and searchable with standard web search engines. In one embodiment, the data extraction module (120) may access the more internal sources (125) and the one or more external sources (125) through one or more crawlers using a web server. In such embodiment, the one or more crawlers may access the data based on one or more parameters. In one embodiment the one or more parameters may include at least one of a keyword, content of search and a search string which may be used previously to access the data from the one or more internals sources (125) or the one or more external sources (125).

The processing subsystem (110) also includes an analysis module (130) operatively coupled to the data extraction module (120). The analysis module (130) is configured to analyse the data by using at least one threat analysis method for detection of the threat. In one embodiment, the at least one threat analysis method may include at least one of a co-relation analysis technique, a behavioural analysis technique and a contextual analysis technique. As used herein, the term 'co-relation analysis' is defined as a method of statistical evaluation used to study the strength of a relationship between two numerically measured, continuous variables.

In one embodiment, the at least one of a correlation analysis method may include a Pearson co-relation analysis, Kendall rank co-relation analysis, Spearman correlation analysis and point-biserial correlation analysis. As used herein, the term 'behavioural analysis' is defined as a method that reveals new insights into the behaviour of consumers on electronic commerce platforms, online games, web, mobile applications, and internet of things. As used herein, the term 'contextual analysis' is defined as a method of studying text and the cultural, social, or political context of the text. In one embodiment, the contextual analysis may include a method of qualitative comparative analysis methods (QCA).

Further, the term 'QCA' is defined as an analysis method which uses statistical techniques to implement comparison methods for making detailed analysis with the content of the data acquired. In some embodiment, the one or more QCA method may include one or more methods such as crisp-set qualitative comparative analysis methods (csQCA) and fuzzy-set qualitative comparative analysis (fsQCA) methods. In some embodiment, the analysis module (130) may analyse one or more elements from the combined data based on which the threat may be analysed using the at least one analysis method. The one or more elements may include at least one of a context of the data, depth of the context of the data, relationship between the context and the one or more parameters, interaction or communication within the one or more internal sources and the one or more external sources based on the context of the data.

In one embodiment, the analysis module (130) may further analyse and determine a type of the threat, one or more existing threats, one or more upcoming threats and the like. In such embodiment, the analysis module (130) may further detect the threat from at least one of a specific environment, a specific geographical area, a specific sector of an organization and the like which may be affected, or which may face the threat.

The processing subsystem (110) also includes a rule generation module (140) operatively coupled to the analysis module (130). The rule generation module (140) is configured to generate one or more rules to enable prevention of the threat detected. In one embodiment the one or more rules may be generated to ensure security. The one or more rules generated may be utilised to prevent the threat as analysed by the analysis module (130). More specifically, based upon the threat which may be determined by the analysis module (130), the rule generation module (140) generates the one or more rules which may be further implemented to prevent the determined threat.

In such embodiment, the one or ore rules may be generated in real-time by monitoring the analysed data and generating security reports based upon the monitored data. In some embodiment, the one or more rules may be generated for routers and firewalls which may be a primary source of access to the one or more internal sources (125) and the one or more external sources (125). In such embodiment, the one or more rules may be generated by the rule generation module (140) to deny the access of acquiring the data from the one or more internal sources (125) and the one or more external sources (125). In one embodiment, the one or more rules generated may evaluate every packet of the data acquired by the acquisition module for prevention of threat including but not limited to viruses, worms, reconnaissance activity, backdoor usage, and buffer overflows. In some embodiment, the one or more rules generated may examine the incoming packets and may drop a detected malicious packet. In such embodiment, the one or more rules may be updated when new attack signatures may be identified.

The processing subsystem (110) also includes an implementation module (150) operatively coupled to the rule generation module (140). The implementation module (150) is configured to implement the one or more generated rules on at least one node associated with the one or more internal sources (125) for prevention of the threat. In one embodiment, the one or more generated rules may be implemented on the at least one node by mapping the detected threat after monitoring, with a specific real-time problem. In one exemplary embodiment, the at least one node may correspond to at least one computer device through which the access to the one or more internal sources (125) and the one or more external sources (125) may be enforced to indulge in the malicious activities. More specifically, the malicious activities may be initiated through the at least one computer device which may correspond to the at least one node. In such a situation, the one or more which may be generated by the rule generation module (140) may be implemented on the corresponding at least one node to prevent the access of the data from the one or more internal sources (125) and the one or more external sources (125) for preventing the detected threat which may be initiated from the at least one node.

In some embodiment, one or more actions may be taken in order to cease or disrupt an attack based on the one or more rules generated for prevention of threat. In such embodiment, implementing the one or more rules generated may also include generating a notification to alert a system administrator to prevent the threat.

The system (100) also includes a memory (160) operatively coupled to the processing subsystem (110). The memory (160) is configured to store the one or more generated rules associated to the threat. In some embodiment, the processing subsystem (110) operatively coupled to the memory (160) may be stored on a remote storage. As used herein, the term 'remote storage' is defined as a storage element which is used to store data in a remote server which may be accessed through the internet. In one embodiment, the data may be stored on a cloud storage which may be further retrieved by the analysis module (130) for further analyses and the prediction of the threat. In such embodiment, the remote storage system may help to host, edit, share and sync stored data on the web server.

In one exemplary embodiment, the memory (160) may correspond to a network attached storage (NAS). As used herein, the term 'NAS' is defined as a file level computer data storage server which is connected to a computer network for providing data access to the user. Further, the NAS may provide data access to heterogeneous group of users.

In a specific embodiment, the system (100) further includes a representation module (170) operatively coupled to the analysis module (130). The representation module (170) is configured to present the threat in one or more forms. In such embodiment, the one or more forms may include a report, a dashboard, a structured threat information expression and an application programming interface. In one embodiment, the one or more forms may include at least one of a report, a dashboard, a structured threat information expression (STIX) and an application programming interface (API). As used herein, the term 'API' is defined as a set of function, a definition, a protocol and a tool for building software. As used herein, the term 'protocol' is defined as the valid sequence of messages which flows between the APIs of multiple parties to accomplish some higher-level task. As used herein, the term 'STIX' is defined as a technique which is used for describing threat information. Such threat information may be stored, analysed and shared in a pre-defined method.

Figure 2:
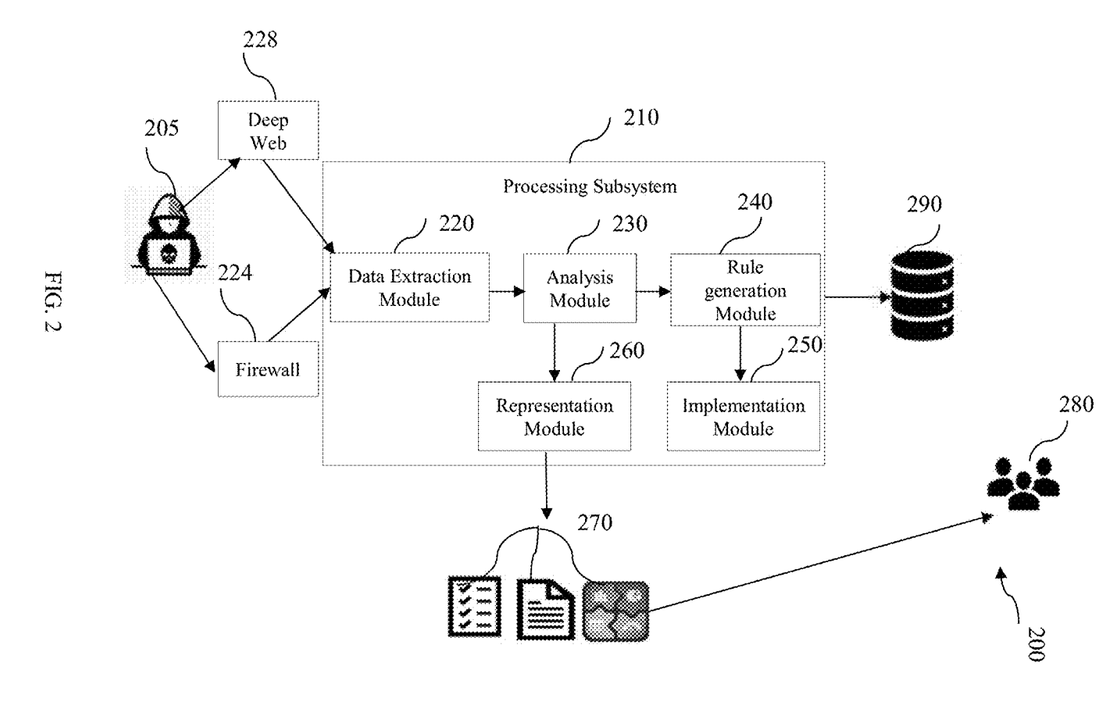
FIG. 2 is a block diagram representation of an exemplary system for prevention of threat in a financial organization of FIG. 1 in accordance with an embodiment of the present disclosure.

FIG. 2 is a schematic representation of an exemplary system (200) for prevention of threat of FIG. 1 in accordance with an embodiment of the present disclosure. The system (200) represented in FIG. 2 is substantially similar to the system (100) of FIG. 1. The system (200) includes a processing subsystem (210) operatively coupled to the memory (270). The processing subsystem (210) also includes a data extraction module (220), an analysis module (230), a rule generation module (240) an implementation module (250) and a representation module (260). The system (200) is utilized for prevention of threat.

For example, data related to a threat is an illegal content and may not be available easily by searching using traditional search engines. The illegal content of data is generated due to cybercrimes or attack by the hackers (205). Such illegal content of the data may be obtained from one or more sources by using data extraction methods. For example, the one or more sources may include an internal source or an external source. Here, the internal source used is a firewall (224). Similarly, the external source here represents a deep web (228). The illegal content of the data from such firewall (224) and the deep web (228) is extracted by using one or more extraction methods by a data extraction module (220). The extracted data is then analysed which helps in detection of threat.

For example, in order to identify the type of threat in a financial organisation, analysis of the threat to take preventive measures is essential. The analysis of the threat is performed by the analysis module (230) using at least one threat analysis method upon acquiring the data from the deep web and through the firewall. The threat analysis is done by using a co-relation analysis method, a behavioural analysis method and a co-relation analysis method. For example, the analysis module (230) implies a co-relation analysis method on the acquired data where, after obtaining the extracted data, bi-variate analysis for measuring the strength of association between two variables and direction of the relationship is done. Similarly, behavioural analysis method is also used for analysis of the data acquired by the deep web and the firewall. Also, contextual analysis of the acquired data is done in order to understand the context of the data extracted.

Upon understanding the context of the acquired data using qualitative comparative analysis technique, threat associated with the extracted data is detected. The analysis of the extracted data is performed in order to identify the type of threat, reason for the threat and indications of the threat so that early prevention of the threat may be done. Here, after detailed analysis is done, one or more rules are generated by the rule generation module (240) to enable prevention of the threat detected.

Furthermore, the one or more rules are generated in order to ensure security. For example, the one or more rules such may include real-time monitoring of the problem such as evaluating every incoming packets and dismissing or dropping a detected malicious packet. The one or more rules generated evaluate the incoming packets by detecting virus, worms or any reconnaissance activity. The one or more rules generated here examine the routers and firewalls for the incoming packets. After, the one or more rules are generated, implementation of such rules for prevention of threat is essential. The implementation of such rules to protect the financial organisation from further threat is done by implementing the one or more rules using an implementation module (250).

The one or more rules are implemented on at least one node associated with the one or more internal sources through which the financial organization was being hacked. Here, one or more actions by implementing the one or more rules, are taken to cease or disrupt the attack which occurs in the financial organisation. Such actions may be taken by alerting the system administrator for prevention by sending notifications. Such notification may be generated in form of real-time alarms for investigation and handling the threat in the financial organisation. The threats after detected are further represented by a representation module (260) in one or more forms (270) such as at least one of a report, a dashboard or an application programming interface (API) to alert the one or more employees (280) of the financial organisation. Also, the one or more rules generated and the method of implementation of such rules to prevent threat in the financial organisation are on a remote storage. Here, the remote storage may include a remote server on a cloud-based platform. Also, the memory may correspond to a (network attached storage) NAS.

Figure 3:
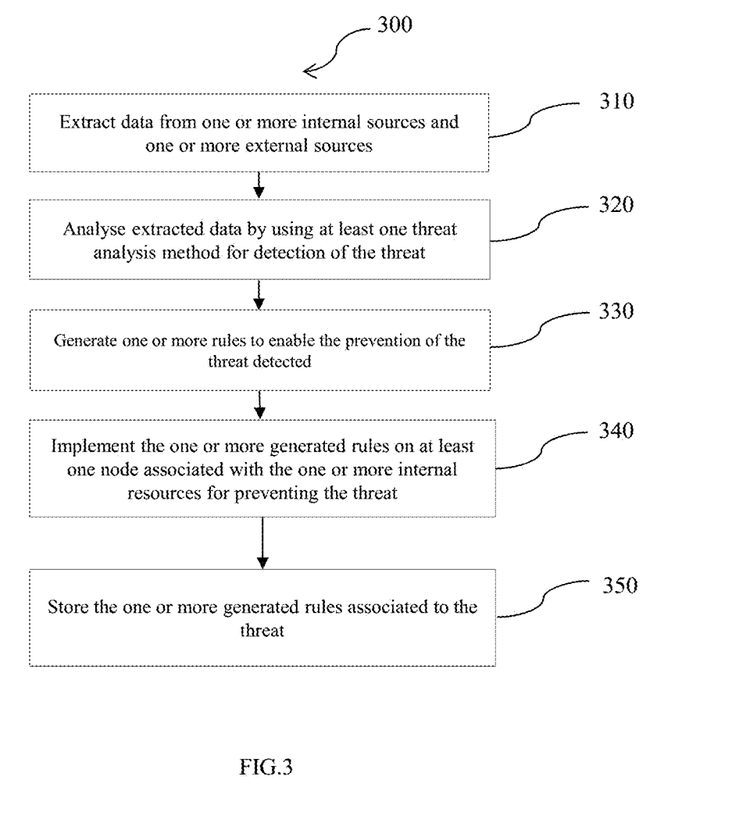
FIG. 3 is a flow chart representing the steps involved in a method for prevention of threat in accordance with the embodiment of the present disclosure.

FIG. 3 is a flow chart representing the steps involved in a method (300) for prevention of threat in accordance with the embodiment of the present disclosure. The method (300) includes extracting data from one or more internal sources and one or more external sources in step 310. Extracting the data from the one or more internal sources includes extracting the data from the at least one of a firewall, a router and a security solution associated with the one or more internal sources. Extracting the data from the one or more external sources includes extracting the data from at least one of a deep web, a dark web and a surface web associated with the one or more external sources.

In one embodiment, extracting the data from the one or more internal sources and the one or more external sources may include extracting the data from a data extraction module. In one exemplary embodiment, extracting the data from the one or more internal sources may include extracting the data from associated with at least one of an audit report, a vulnerability assessment report and the like.

The method (300) also includes analysing extracted data by using at least one threat analysis method for detection of the threat in step 320. In one embodiment, analysing the acquired data by using the at least one threat analysis method may include analysing the data by using at least one of a co-relation analysis technique, a behavioural analysis technique and a contextual analysis technique. In one exemplary embodiment, analysing the data may include analysing the data by an analysis module which may be operatively coupled to the data extraction module. In one exemplary embodiment, analysing the data may include combining the data acquired by the one or more internal sources and the one or more external sources. Consequently, analysing the combined data.

The method (300) also includes generating one or more rules to enable prevention of the threat detected in step 330. In one embodiment, generating the one or more rules to enable prevention of the threat may include generating the one or more rules for ensuring security. In one exemplary embodiment, generating the one or more rules may include generating the one or more rules by a rule generation module which may be operatively coupled to the analysis module. In such embodiment, the method may further include denying an access to acquire the data from the one or more internal sources and the one or more external sources based on one or more generated rules. In such another embodiment, the method may further include monitoring the analysed data and generating security reports based upon the monitored data.

The method (300) also includes implementing the one or more generated rules on at least one node associated with the one or more internal sources for preventing the threat in step 340. In one embodiment, implementing the one or more generated rules on at least one node may include mapping the detected threat after monitoring, with a specific real-time problem. consequently generating a notification on the at least one node associated with the one or more internal sources.

The method (300) also includes storing the one or more generated rules associated to the threat in step 350. In one embodiment, storing the one or more generated rules associated with the threat may include storing the one or more rules on a remote storage. In one exemplary embodiment, storing the one or more rules may include storing the one or more rules on a network attached storage (NAS), In such embodiment, the method may further include providing data access to heterogeneous group of users.

In a specific embodiment, the method further includes presenting the data associated with the threat in one or more forms, wherein the one or more forms comprises at least one of a report, a dashboard, a structured threat information expression and an application programming interface. In one specific embodiment, presenting the analysed data may include presenting the analysed data by a representation module which may be operatively coupled to the analysis module, in another embodiment, the method may include generating an alert notification upon detecting the threat based on one or more elements, wherein the one or more elements may include at least one of a context of the data, depth of the context of the data, relationship between the context and the one or more parameters, interaction or communication within the one or more internal sources and the one or more external sources based on the context of the data.

Various embodiments of the present disclosure enable the system to generate the one or more rules and implements the generated one or more rules on the one or more nodes automatically upon detecting the threat from the data acquired by the one or more internal sources and the one or more external sources. Such implementation of the one or more rules enable the system to prevent the threat in real-time without intervention of the user. Thereby, increasing efficiency of the system and also decreases the delay factor.

Moreover, as the present disclosed system extracts data from both the one or more internal sources and the one or more external sources which may also increase the level of analysis and further improves accuracy of prediction for prevention of threat.

While specific language has been used to describe the invention, any limitations arising on account of the same are not intended. As would be apparent to a person skilled in the art, various working modifications may be made to the method in order to implement the inventive concept as taught herein.

The figures and the foregoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, order of processes described herein may be changed and are not limited to the manner described herein. Moreover, the actions of any flow diagram need not be implemented in the order shown; nor do all of the acts need to be necessarily performed. Also, those acts that are not dependent on other acts may be performed in parallel with the other acts. The scope of embodiments is by no means limited by these specific examples

I claim:

1. A system for prevention of threat comprising:
 a memory configured to store one or more generated rules associated with a threat;
 a processing subsystem operatively coupled to the memory, wherein the processing subsystem comprises:
 a data extraction module configured to extract data from one or more internal sources and one or more external sources through one or more web crawlers using one or more parameters, wherein the one or more parameters comprises at least one of a keyword, content of search and a search string; wherein the one or more external sources comprises at least one of a deep web, a dark web and a surface web;
 an analysis module operatively coupled to the data extraction module, wherein the analysis module is configured to:
 analyse one or more elements from extracted data by using at least one of a co-relation analysis technique, a behavioural analysis technique and a contextual analysis technique; and
 determine a type of threat, one or more existing threats and one or more upcoming threats based on one or more analysed elements, wherein the type of threat, the one or more existing threats and the one or more upcoming threats are obtained from at least one of a specific environment, a specific geographical area or a specific sector of an organization;
 a rule generation module operatively coupled to the analysis module, wherein the rule generation module is configured to:
 generate one or more rules in real time by monitoring the type of the threat, the one or more existing threats and the one or more upcoming threats determined by the analysis module; and
 evaluate every packet of the extracted data based on one or more generated rules; and
 an implementation module operatively coupled to the rule generation module, wherein the implementation module is configured to:
 implement the one or more generated rules on at least one node corresponding to at least one computer device indulged in malicious activities upon evaluation of every packet of the extracted data; and
 generate a notification in real-time to alert a system administrator to take one or more actions for prevention of threat upon implementing the one or more generated rules.

2. The system as claimed in claim 1, wherein the processing subsystem operatively coupled to the memory is stored on a remote storage.

3. The system as claimed in claim 1, further comprising a representation module operatively coupled to the analysis module, and configured to present the threat in one or more forms, wherein the one or more forms comprises at least one of a report, a dashboard, a structured threat information expression and an application programming interface.

4. The system as claimed in claim 1, wherein the one or more internal sources comprises at least one of a firewall, a router and a security solution.

5. The system as claimed in claim 1, wherein the one or more elements comprises at least one of a context of the data, depth of the context of the data, relationship between the context and the one or more parameters, interaction or communication within the one or more internal sources and the one or more external sources.

6. The system as claimed in claim 1, wherein the one or more actions comprises deny access of acquiring the data from the one or more internal sources and the one or more external sources, drop a detected malicious packet or cease or disrupt an attack.

7. A method for preventing a threat comprising:

extracting, by a data extraction module, data from one or more internal sources and one or more external sources through one or more web crawlers using one or more parameters, wherein the one or more parameters comprises at least one of a keyword, content of search and a search string, wherein the one or more external sources comprises at least one of a deep web, a dark web and a surface web;

analysing, by an analysis module, one or more elements from extracted data by using at least one of a co-relation analysis technique, a behavioural analysis technique and a contextual analysis technique;

determining, by the analysis module, a type of the threat, one or more existing threats and one or more upcoming threats based on one or more analysed elements, wherein the type of threat, the one or more existing threats and the one or more upcoming threats are obtained from at least one of a specific environment, a specific geographical area or a specific sector of an organization;

generating, by a rule generation module, one or more rules in real time by monitoring the type of the threat, the one or more existing threats and the one or more upcoming threats determined by the analysis module;

evaluating, by the rule generation module, every packet of the extracted data based on one or more generated rules;

implementing, by an implementation module, the one or more generated rules on at least one node corresponding to at least one computer device indulged in malicious activities upon evaluation of every packet of the extracted data; and generating, by the implementation module, a notification in real-time to alert a system administrator to take one or more actions for prevention of threat upon implementing the one or more generated rules.

8. The method as claimed in claim 7, wherein storing the one or more generated rules associated to the threat comprises storing the one or more generated rules associated to the threat on a remote storage.

9. The method as claimed in claim 7, further comprising presenting the data associated with the threat in one or more forms, wherein the one or more forms comprises at least one of a report, a dashboard, a structured threat information expression and an application programming interface.

* * * * *